United States Patent [19]

Aubry

[11] Patent Number: 5,330,322
[45] Date of Patent: Jul. 19, 1994

[54] CYLINDRICAL ELASTOMERIC BEARING WITH LARGE ANGULAR DEFLECTION

[75] Inventor: Jacques A. Aubry, Cabries, France

[73] Assignee: Aerospatiale Societe National Industrielle, Paris, France

[21] Appl. No.: 994,748

[22] Filed: Dec. 22, 1992

[30] Foreign Application Priority Data

Dec. 26, 1991 [FR] France ................ 91 16185

[51] Int. Cl.⁵ ................ B64C 27/35; F16C 27/06
[52] U.S. Cl. ................ 416/134 A; 384/222; 267/141.1; 267/141.2
[58] Field of Search ............ 416/134 A, 141; 384/220, 221, 222; 248/603, 604; 267/141.1, 141.2, 141.3, 141.7, 294

[56] References Cited

U.S. PATENT DOCUMENTS

| | | | |
|---|---|---|---|
| 3,231,222 | 1/1966 | Scheutzow | 416/134 A |
| 4,044,977 | 8/1977 | Feucht | 267/141.3 |
| 4,129,403 | 12/1978 | Watson | 416/134 A |
| 4,257,739 | 3/1981 | Covington et al. | 416/134 A |
| 4,986,735 | 1/1991 | Robinson | |

FOREIGN PATENT DOCUMENTS

| | | |
|---|---|---|
| 0077132 | 4/1983 | European Pat. Off. |
| 0225250 | 6/1987 | European Pat. Off. |
| 1238110 | 6/1960 | France ................ 267/294 |
| 1297406 | 5/1962 | France ................ 384/220 |
| 1542617 | 9/1968 | France |
| 2358316 | 2/1978 | France |
| 2094393 | 9/1982 | United Kingdom |

*Primary Examiner*—Edward K. Look
*Assistant Examiner*—James A. Larson
*Attorney, Agent, or Firm*—Nikaido, Marmelstein, Murray & Oram

[57] ABSTRACT

The invention relates to a cylindrical elastomeric bearing with wide angular deflection comprising three cylindrical elements: a central element (1) and two lateral elements (2, 3) arranged either side of the central element (1). Each torsible cylindrical element is made up of a deformable elastomeric central part, relatively flexible angularly and relatively rigid radially, which is rigidly locked to an inner armature and to an outer armature; the outer armature (6) of the central element (1) and the inner armature (8, 11) of each lateral element (2, 3) are rigidly locked together so as to form a single part, the common armature (13). The inner armature (5) of the central element (1) is mounted on an inner sleeve (14) to which it is rigidly locked, and the outer armature (9, 12) of each lateral element (2, 3) is mounted in an outer sleeve (15) to which it is rigidly locked; inner sleeve (14) and outer sleeve (15) are coaxially arranged in such a way that the outer sleeve (15) and the inner sleeve (14) can rotate in relation to each other about their common axis with virtually no possibility of radial deflection.

30 Claims, 5 Drawing Sheets

CYLINDRICAL ELASTOMERIC BEARING WITH LARGE ANGULAR DEFLECTION

BACKGROUND OF THE INVENTION

This invention relates to a cylindrical elastomeric bearing with wide angular deflection and being relatively rigid radially, which is mounted between an inner sleeve and an outer sleeve, in such a way that the outer sleeve and the inner sleeve can rotate in relation to each other about their common axis with virtually no possibility of radial deflection. These types of cylindrical elastomeric bearings, in accordance with the invention, which function without any lubrication, can be mounted in particular on a gyroplane rotor head between the hub body and each blade to form a pitch changing articulation for the blades.

Many types of bearings are already known that offer some flexibility between the inner part and outer part, and which are used in particular in the structures that connect each of the blades of a gyroplane to the body of the rotor hub.

French Patent No. 2 358 316 refers to these types of connecting structures, its object being a helicopter rotor comprising a rotor hub that rotates about a substantially vertical axis, and which includes a set of rotor blades. According to this patent, the hub is provided, for each blade, with a bending element which extends substantially radially from the hub, and which is elastically flexible in the blade's beating plane. In accordance with this invention, the hub comprises a pitch changing articulation at the end turned towards the outside of the bending element, and which comprises a substantially tubular portion. This substantially tubular portion is fitted, on the side of the end turned towards the outside, with means for fixing the rotor blade. Moreover, this tubular portion is fitted so as to pivot on an inner bearing and an outer bearing, in relation to the axis of the rotor. These two bearings are made of an elastomer, and are mounted separately from each other on a spindle which extends the bending element. An elastic assembly designed to work in shear is associated with the outer bearing so as to allow drag movements of the tubular portion and of its associated blade. These drag movements are made about the geometric center of the inner bearing. The inner bearing comprises two elementary elastomeric bearings mounted on a support about the geometric center of this inner bearing. The outer surface of one of the elementary elastomeric bearings is mounted so as to be locked in rotation in the tubular portion, while the outer surface of the second elementary bearing is fixed to the spindle by means of a thrust device. This thrust device allows the forces due to the centrifugal force to be transmitted to the hub via the inner bearing. According to this invention, the outer bearing comprises an annular elastomeric component which has an inner surface fixed to the spindle and an outer surface which is fixed to the inside of a coaxial sleeve. The above mentioned elastic assembly working in shear is thus housed between this coaxial sleeve and the corresponding inner surface of the tubular portion. The elastic assembly working in shear comprises a shearing annular elastic component of which one surface is fixed to a collar formed by an extension of the coaxial sleeve and which extends perpendicularly to the axis of the tubular portion, and whose other opposing surface is fixed to a collar provided inside the tubular portion. The shearing elastic component is made from a visco-elastic synthetic material whose suitable hysteretic properties give it an automatic damping effect when it is subjected to shearing movements.

French Patent No. 2 358 316 therefore relates to an elastomeric bearing which allows radial deflection so as to provide the articulation assembly with a certain degree of drag flexibility in the plane of the rotor, by rotating about the center of the inner bearing, which then acts as a trunnion. Moreover, to introduce damping into this drag pseudo-articulation, this invention uses elastic elements made of a visco-elastic material exhibiting strong hysteretic properties. This results in a bearing comprising two parts: a first part, made up of the inner bearing and the outer bearing, allowing limited angular deflection about the axes of these bearings, and a second part formed by an elastic assembly working in shear, which allows the tubular portion to move angularly in relation to the spindle with elastic return and damping of these movements.

The type of rotor defined in this patent has the drawback that the connecting structures used between the hub body and each blade are complex structures combining several functions: angular deflection about the blade axis to allow pitch change control, and drag angular deflections with their damping.

SUMMARY OF THE INVENTION

The object of the present invention is to propose a cylindrical elastomeric bearing with wide angular deflection which is mounted between an inner sleeve and an outer sleeve, and which is arranged in such a way that the outer sleeve and inner sleeve can rotate in relation to each other about their common axis with virtually no possibility of radial deflection, and in a structure requiring a minimum of components.

The cylindrical elastomeric bearing with wide angular deflection, in accordance with the invention, comprises three coaxial cylindrical torsible elements: one central element, and two lateral elements arranged either side of the central element. Each torsible cylindrical element comprises a deformable elastomeric central part, relatively flexible angularly and relatively rigid radially, which is rigidly locked to an inner armature and an outer armature. The outer armature of the central element and the inner armature of each lateral element are rigidly locked together so as to form a single part: the common armature. The inner armature of the central element is mounted on an inner sleeve to which it is rigidly locked, and the outer armature of each lateral element is mounted in an outer sleeve to which it is rigidly locked. The inner and outer sleeves are coaxially arranged in such a way that the outer sleeve and inner sleeve can rotate in relation to each other about their common axis and with virtually no possibility of radial deflection.

To allow large angular deflection of the bearing assembly, the capacity of each lateral element is substantially half that of the central element, in such a way that the angular deflection of the system of three elements is substantially double that of the central element alone.

Advantageously, the central part of each cylindrical torsible elastomeric element, relatively flexible angularly and relatively rigid radially, is made up of a laminated assembly. In a known manner, this laminated assembly is formed of thin, rigid, coaxial tubes of circular section between which are interposed layers of elastomer. The assembly of the inner armature, outer armature, thin rigid tubes and elastomeric layers is assembled by vulcanization so as to form a body which transmits radial forces with little deformation, but which is elastically flexible angularly to allow rotational movements of the inner and outer armatures in relation to each other. Moreover, the dimensions of the inner and outer faces of the central parts of the three elements are substantially identical in the transverse direction. The central part of the central element and the central part of each of the two lateral elements are cylindrical, the axis being that of the inner and outer sleeves.

In another embodiment of the invention, the central part of the central element and the central part of each of the two side elements are in the shape of a truncated cone, the axis being that of the inner and outer sleeves.

Preferably, in accordance with one embodiment of the present invention, the cylindrical bearing comprises two intermediary armatures each integrally forming the inner armature of the corresponding lateral element, these two intermediary armatures being rigidly locked to the outer armature of the central element, so as to form the common armature. Each of the intermediary armatures is fixed to the outer armature of the central element by forced fitting.

Moreover, the radial dimensions of the inner and outer faces of the common armature are substantially equal to, respectively, those of the outer cylindrical faces of the inner sleeve and the inner cylindrical faces of the outer sleeve, so that in the event of the torsible elastomeric elements deteriorating, they form plain back-up bearings with sufficient working play, on application of different radial forces and circular deflection of the inner and outer sleeves, in relation to each other. In an embodiment of the invention, the inner sleeve is fitted with a bearing surface arranged on each side of the inner armature of the central element, the radial dimensions of whose outer face are substantially equal to those of the corresponding inner face of the common armature, in such a way as to form the corresponding plain back-up bearing. Moreover, the outer armature of each of the two lateral elements is rigidly locked to the outer sleeve by forced fitting, and the inner armature of the central element is rigidly locked to the inner sleeve by forced fitting.

In accordance with a particular embodiment of the invention, a system of cylindrical bearings comprises two cylindrical bearings with wide angular deflection, in which:

one of the ends of the inner sleeve is fitted with one of the two cylindrical bearings with wide angular deflection;

one of the ends of the outer sleeve is fitted with the other cylindrical bearing with wide angular deflection;

in such a way that the two cylindrical bearings are at opposite ends from each other, and that the central part of each of the elements of one of the cylindrical bearings is identical to the central part of each of the corresponding elements of the other cylindrical bearing.

The structure of the cylindrical bearing system is designed so that:

the inner sleeve comprises an outer cylindrical face which abuts upon a first bearing face, and which is fitted with:

one of the two bearing surfaces, the central element and the other bearing surface of the first of the two cylindrical bearings;

an inner tie-piece;

one of the two bearing surfaces, the central element and the other bearing surface of the second cylindrical bearing;

means for axially holding the assembly of elements fitted to the outer cylindrical face of the inner sleeve, in such a way as to make them bear against the first bearing face;

the outer sleeve comprises an inner cylindrical face which abuts upon a second bearing face, and which is fitted with:

the two lateral elements of the second cylindrical bearing;

an outer tie-piece;

the two lateral elements of the first cylindrical bearing;

means for axially holding the assembly of the elements fitted to the inner cylindrical face of the outer sleeve, in such a way as to make them bear against the second bearing face.

The means for axially holding the assembly of elements fitted to the outer cylindrical face of the inner sleeve comprise a thread made at the end of this cylindrical face, opposite the bearing face, and a nut which engages in this thread, in such a way as to make the assembly of elements bear against the bearing face. The means for axially holding the assembly of elements carried by the inner cylindrical face of the outer sleeve comprise means for fixing the outer armature of the lateral element of the first cylindrical bearing, arranged at the end of the inner cylindrical face, opposite the bearing face, these fixing means securing the outer armature of the lateral element to the corresponding end of the outer sleeve. The means for fixing the outer armature of the lateral element of the outer sleeve comprise bolts which secure a flange made on the periphery of the end of the outer armature of the lateral element to a flange made at the corresponding end of the outer sleeve.

To further improve the characteristics of this structure, the connecting pieces are arranged in corresponding holes made respectively:

in the outer sleeve, on the bearing face, and in the outer armature of the corresponding lateral element of the second cylindrical bearing, so as to rigidly lock in rotation the lateral element with the outer sleeve;

in the outer armature of the other lateral element of the second cylindrical bearing, and in the outer tie-piece on the corresponding end face, so as to rigidly lock in rotation the outer tie-piece with the lateral element;

in the outer tie-piece, on the other end face, and in the outer armature of the corresponding lateral element of the first cylindrical bearing, so as to rigidly lock in rotation the lateral element with the outer tie-piece.

In accordance with the invention, the system of cylindrical elastomeric bearings can be applied to the rotor head of a gyroplane, particularly a helicopter, where it is mounted for the fixing of each of the blades to the hub body.

In this type of application, the head of the rotor comprises a hub body fitted, for each blade, with an arm which is the inner sleeve of the corresponding cylindrical bearing system, and whose outer sleeve is connected to the blade. The device for controlling the pitch of the blade is connected to the outer sleeve, and a direct connection is made between the hub body and the corresponding blade, this direct connection being flexible in torsion and rigid in traction, so that the stresses due to the centrifugal forces of the blade are directly transferred to the hub body.

The direct connection between the hub body and the corresponding blade is ensured by a torsible bundle arranged inside the inner sleeve; one end of this torsible bundle is mounted in an inner intermediary element rigidly locked to the hub body, and the other end in an outer intermediary element is rigidly locked to the blade.

In this direct connection, the inner intermediary element comprises a housing which flares out towards the axis of the rotor, in such a way that it receives and matches the outer shape or form of the corresponding end piece of the torsible bundle. The inner intermediary element is mounted in a double yoke belonging to the hub body, the intermediary element and the double yoke each having two holes aligned in relation to each other, along an axis substantially parallel to the rotor axis, in such a way as to receive the two fixing bolts that secure the inner intermediary element to the hub body.

The outer intermediary element comprises a housing which flares out towards the blade, in such a way as to match and receive the outer shape or form of the corresponding end of the torsible bundle. The outer intermediary element has a double yoke in which the foot of the blade engages, the double yoke and the foot of the blade each having two holes aligned with each other, along an axis substantially parallel to the axis of the rotor, in such a way as to receive the two bolted spindles that secure the blade to the outer intermediary element.

In the gyroplane rotor application, the inner sleeve is provided with a flange made at the end opposite the threaded end. This flange presses against a flange of the inner intermediary element, the flange of the inner sleeve being rigidly locked to the corresponding flange of the inner intermediary element by bolts, so as to form the corresponding arm of the hub body.

In the gyroplane rotor application, the outer sleeve is provided with a a double yoke made at the end located opposite the fixing bracket of the lateral element of the first bearing. This double yoke receives the outer intermediary element, the double yoke and outer intermediary element each having two holes aligned with each other, along an axis substantially parallel to the axis of the rotor, in such a way as to receive the two fixing bolts which secure the outer sleeve to the outer intermediary element.

The device for controlling the pitch of the blade is connected to a support made on the outer sleeve. The support is directly connected to the flange of the outer sleeve, and comprises an articulation axis on which the pitch control rod is mounted.

The first advantageous characteristic of the cylindrical elastomeric bearing with wide angular deflection, in accordance with the invention, is that it allows the outer sleeve and the inner sleeve to rotate in relation to each other about their common axis with virtually no possibility of radial deflection. Moreover, the specific embodiment of the invention, which consists in having a central element and two lateral elements arranged on either side of the central element, offers the possibility of obtaining very large angular displacement or deflection within a relatively small radial area. Moreover, the embodiment of the elastomeric bearing device, in accordance with the invention, is extremely simple, owing to the presence of the common armature between the central element and each of the two lateral elements. As a result, this type of cylindrical elastomeric bearing with wide angular deflection, in accordance with the invention, can be combined with another cylindrical bearing of the same type, so as to make up a system forming a whole, arranged between an inner sleeve and an outer sleeve, and which does not require any in-service lubrication. This system of cylindrical elastomeric bearings, in accordance with the invention, is ideal in particular for mounting in the rotor head of a gyroplane, and more precisely in the rotor head of a helicopter. In this type of application, a system of cylindrical elastomeric bearings, in accordance with the invention, is arranged between the hub body and each of the blades of the rotor head. This gives a semi-rigid rotor head in which each of the blades is connected to the hub body by a system of cylindrical elastomeric bearings with wide angular deflection, in accordance with the invention. In this type of application, each system of cylindrical elastomeric bearings receives the device for controlling the pitch of the corresponding blade. This embodiment, in accordance with the invention, is particularly advantageous since it isolates the pitch control function from the other functions. In fact, the torsible bundle bears all the stresses due to the centrifugal force exerted on the corresponding blade, and the bending, beating and drag moments of the blade as well as the cutting stresses of the blade are absorbed either by the blade itself or by the hub body with its blade support arms.

BRIEF DESCRIPTION OF THE DRAWINGS

Additional advantages will appear hereinafter from the detailed and non-limiting description of a number of particular embodiments of the invention and from the disclosures set forth by the drawings wherein.

DETAILED DESCRIPTION OF PREFERRED EMBODIMENTS

Figure 1:
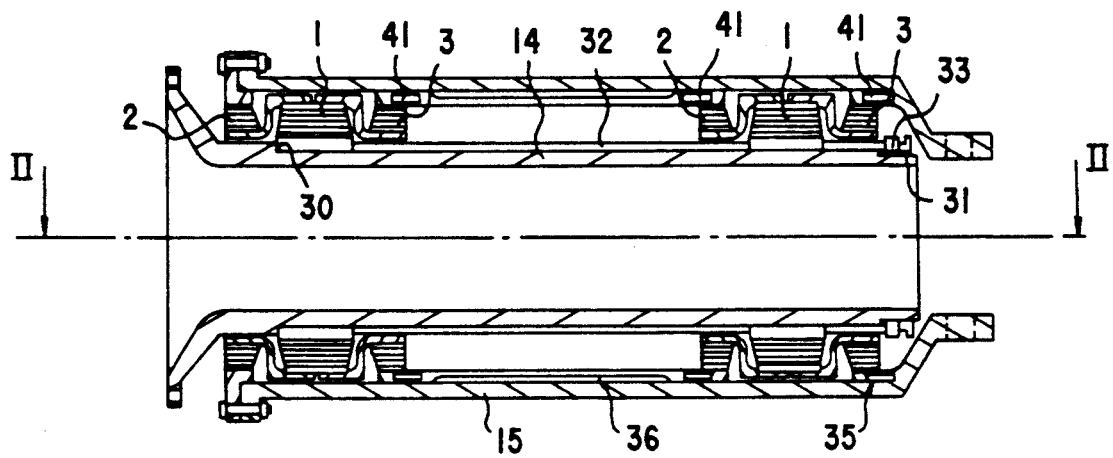
FIG. 1 is an axial sectional view of a system of cylindrical elastomeric bearings with wide angular deflection in accordance with the invention.
Figure 2:
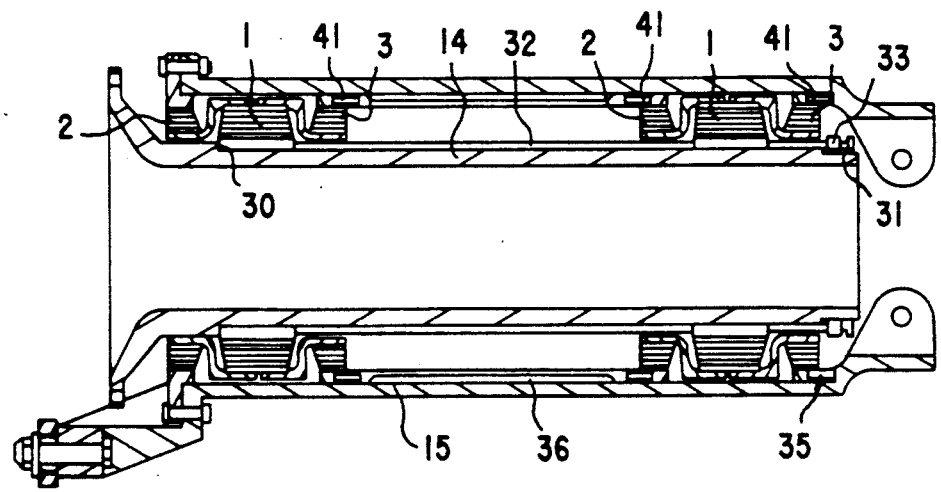
FIG. 2 is an axial sectional view taken along the line II—II of FIG. 1.

The invention relates to a system of two cylindrical elastomeric bearings with wide angular deflection, as shown in FIGS. 1 and 2. These two cylindrical elastomeric bearings are mounted between an inner sleeve 14 and an outer sleeve 15, in such a way that:

one of the ends of inner sleeve 14 is fitted with one of the two cylindrical elastomeric bearings with wide angular deflection;

one of the ends of outer sleeve 15 is fitted with the other cylindrical elastomeric bearing with wide angular deflection.

The two cylindrical elastomeric bearings are arranged between inner sleeve 14 and outer sleeve 15 in such a way that they face each other at each end of the assembly.

Each of the two cylindrical elastomeric bearings with wide angular deflection comprises, in accordance with the invention, three cylindrical elements: a central element 1 and two lateral elements, respectively 2 and 3, arranged either side of central element 1. The first cylindrical bearing with wide angular displacement is mounted on the inner sleeve 14 and presses against bearing face 30 of said inner sleeve 14, said bearing face 30 being perpendicular to the axis of said sleeve. An inner tie-piece 32 is arranged on this inner sleeve 14 between the first cylindrical elastomeric bearing and the second cylindrical elastomeric bearing. The assembly of the first cylindrical elastomeric bearing, the inner tie-piece 32 and the second cylindrical elastomeric bearing is held in place by a nut 33 which engages with a thread 31 made at the end of inner sleeve 14.

The second cylindrical elastomeric bearing is also mounted inside outer sleeve 15 and presses against bearing face 35 of this outer sleeve 15, said bearing face 35 being perpendicular to the axis of outer sleeve 15. An outer tie-piece 36 is arranged between the second cylindrical elastomeric bearing and the first cylindrical elastomeric bearing, and is also mounted inside outer sleeve 15. The assembly of the second cylindrical elastomeric bearing, the outer tie-piece 36 and the first cylindrical elastomeric bearing is held in place axially inside outer sleeve 15 by axial holding means which shall be described below. Moreover, connecting pieces 41 are arranged in corresponding holes made in the second cylindrical elastomeric bearing, in the outer tie-piece 36, in the first cylindrical elastomeric bearing and in outer sleeve 15.

Figure 3:
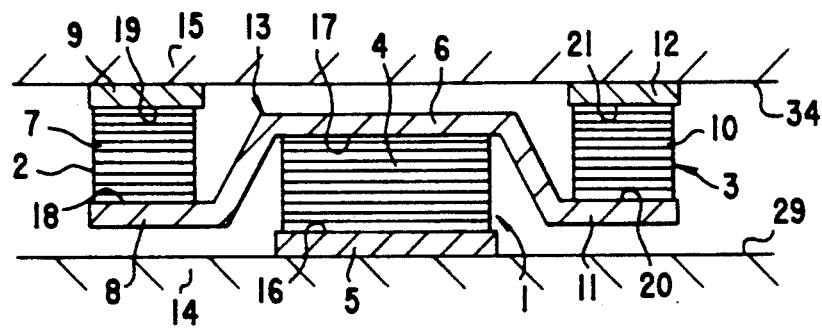
FIG. 3 is an axial half-section view of a cylindrical elastomeric bearing with wide angular deflection in accordance with the invention.

An axial cross-sectional view of the cylindrical elastomeric bearing with wide angular deflection is shown in FIG. 3. This cylindrical bearing comprises three cylindrical elements: a central element 1, and two lateral elements 2 and 3 arranged either side of central element 1. Each cylindrical element is made up of a central elastomeric deformable part, relatively flexible angularly and relatively rigid radially, which is rigidly locked to an inner armature and an outer armature. Central element 1 is therefore made up of central part 4 arranged between an inner armature 5 and an outer armature 6. Likewise, lateral element 2 is made up of central part 7 arranged between an inner armature 8 and an outer armature 9, as well as lateral element 3 which is made up of central part 10 arranged between an inner armature 11 and an outer armature 12. In accordance with a main characteristic of the invention, outer armature 6 of central element 1 is rigidly locked, on the one hand, to inner armature 8 of lateral element 2, and on the other hand, to inner armature 11 of lateral element 3. Outer armature 6 and inner armatures 8 and 11 therefore form a single part which is the common armature 13. Inner armature 5 of central element 1 is mounted on inner sleeve 14 to which it is rigidly locked. Likewise, outer armature 9 of lateral element 2 and outer armature 12 of lateral element 3 are both mounted in outer sleeve 15 to which they are rigidly locked. Inner sleeve 14 and outer sleeve 15 are coaxial, and the cylindrical bearing with wide angular deflection, in accordance with the invention, allows inner sleeve 14 and outer sleeve 15 to turn in relation to each other about their common axis without virtually no possibility of radial deflection.

The cylindrical bearing with wide angular deflection, in accordance with the invention, is therefore made up of a central bearing, represented by central element 1, and a second bearing consisting of two half-bearings which are lateral elements 2 and 3 arranged on either side of central element 1 so as to balance the radial stresses. To achieve this, the capacity of each lateral element 2 and 3 is substantially half that of central element 1. As a result, the angular displacement of the assembly of three elements 1, 2 and 3 is substantially double that of central element 1 alone. To obtain this result, the radial dimensions of the central parts of central element 1 and of lateral elements 2 and 3 are substantially identical taken in order along a transverse direction, i.e. the diameters of inner face 16 of central part 4, inner face 18 of central part 7, and inner face 20 of central part 10 are substantially equal, and the diameters of outer face 17 of central part 4, outer face 19 of central part 7 and outer face 21 of central part 10 are also substantially equal. The axial area of central part 4 and of central parts 7 and 10 is established in such a way that the capacity of each of the two lateral elements 2 and 3 is substantially half that of central element 1.

Central part 4 of central element 1, central part 7 of lateral element 2 and central part 10 of lateral element 3 are made up of a laminated elastomeric assembly, in such a way as to be relatively flexible angularly and relatively rigid radially. An alternating stack of thin, rigid coaxial tubes, possibly metallic, and elastomeric layers is interposed between the outer face of inner armature 5 and the inner face of outer armature 6, between the outer face of inner armature 8 and the inner face of outer armature 9, and between the outer face of inner armature 11 and the inner face of outer armature 12, of central element 1 and of the corresponding lateral elements 2 and 3. This alternating stack comprises truncated-cone shaped cylindrical coaxial tubes and alternating layers of elastomer. Each assembly, comprising inner armature, outer armature, metal tubes and elastomeric layers, is assembled by vulcanization so as to form a body which transmits radial compression without any major deformation, but which is elastically deformable by the shearing of the elastomeric layers of the stack in such a way as to allow relative movements of axial rotation of the inner and outer armatures.

In the embodiment of the cylindrical elastomeric bearing with wide angular deflection shown in FIG. 3, in accordance with the invention, the assembly comprising common armature 13 with outer armature 6 and inner armatures 8 and 11, the inner armature 5, outer armatures 9 and 12 and the rigid coaxial tubes, and the elastomer layers forming each of the central parts 4, 7 and 10, are assembled by vulcanization in such a way as to form a single assembly which transmits the radial stresses without any major deformation, but which is deformed angularly in such a way as to allow rotation movements of inner armature 5, rigidly locked to inner sleeve 14, and of outer armatures 9 and 12, rigidly locked to outer sleeve 15 in relation to each other.

The cylindrical elastomeric bearing with wide angular displacement, as described above and which is represented diagramatically in FIG. 3, provides a means of significantly increasing the angular deformation capacity within a reduced diametrical area, or more precisely, as in the case shown in FIG. 3, a means of obtaining an angular deflection of the assembly that is substantially double that of a single elastomeric bearing, for substantially the same transverse area.

Figure 4:
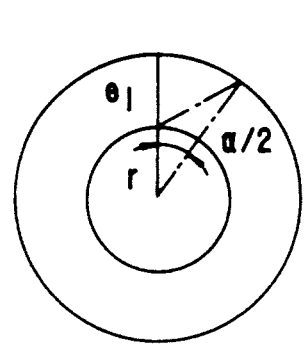
FIG. 4 is a cross-sectional view of a cylindrical elastomeric bearing in accordance with the invention.
Figure 5:
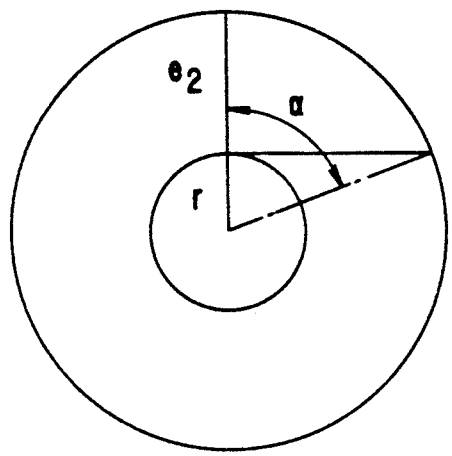
FIG. 5 is a cross-sectional view similar to the one shown in FIG. 4, of a simple cylindrical elastomeric bearing according to the prior art.

FIGS. 4 and 5 show in cross-section views, respectively, the area of a cylindrical elastomeric bearing in accordance with the invention, and the transverse area of a known type of simple elastomeric bearing according to the prior art.

In comparison to the simple bearing, the arrangement of the invention allows the angular deformation capacity to be doubled for the same diametrical area, or, for a given angular deformation, to reduce the thickness of the bearing by more than half owing to:

the reduction in the ratio of two of the angular deformation on a bearing;

the reduction of the shearing factor $\beta$ by the reduction in the ratio $$\frac{\text{outer diameter}}{\text{inner diameter}}.$$

For a double bearing, in accordance with the invention, we obtain:

$$\beta_1 = \frac{(r + e_1)\,\alpha/2}{e1} \text{ where } e_2 = 2e_1 \text{ and } B_2 > B_1$$

For a single bearing we obtain:

$$\beta_2 = \frac{(r + e_2)\,\alpha}{e_2} \quad \beta 2 = \frac{(r + 2e_1)\,\alpha}{2e_1}$$

It is therefore possible to reduce the thickness of the double bearing, in accordance with the invention, in a ratio of more than 2 for the same shearing ratio of the deformable elastomer.

Figure 6:
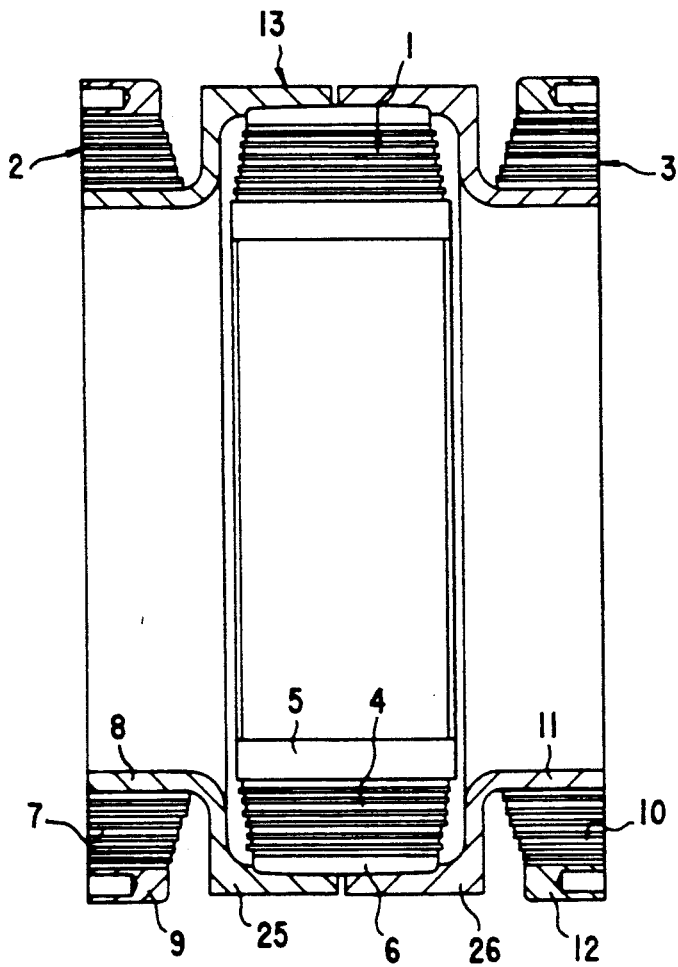
FIG. 6 is an axial cross-sectional view of an embodiment of a cylindrical elastomeric bearing in accordance with the invention.

FIG. 6 shows an axial cross-section of an embodiment of the laminated cylindrical elastomeric bearing with large angular displacement or deflection that is easier to manufacture given the position of the armatures, the injection and the complexity of tooling required for the structure shown in FIG. 3. To achieve this, the laminated cylindrical elastomeric bearing comprises two intermediary armatures 25 and 26, intermediary armature 25 being integrally formed with the inner armature 8 of lateral element 2, and intermediary armature 26 being integrally formed with the inner armature 11 of the other lateral element 3. The two intermediary armatures 25 and 26 are rigidly locked to outer armature 6 of central element 1, in such a way as to form common armature 13. To achieve this, each of the intermediary armatures 25 and 26 are fitted to outer armature 6 of central element 1 by forced fitting. This arrangement, as shown in FIG. 6, also makes it possible to dissociate the bearings represented by central element 1 and lateral elements 2 and 3 at the manufacturing stage, and to fit them at the level of intermediary armatures 25 and 26 to outer armature 6 of central element 1 by forced fitting. This type of laminated cylindrical elastomeric bearing can be fitted between inner sleeve 14 and outer sleeve 15 in such a way that inner armature 5 of central element 1 is rigidly locked to inner sleeve 14 by forced fitting, and in such a way that outer armature 9 of lateral element 2 and outer armature 12 of lateral element 3 are both rigidly locked to the outer sleeve 15 by forced fitting.

Figure 7:
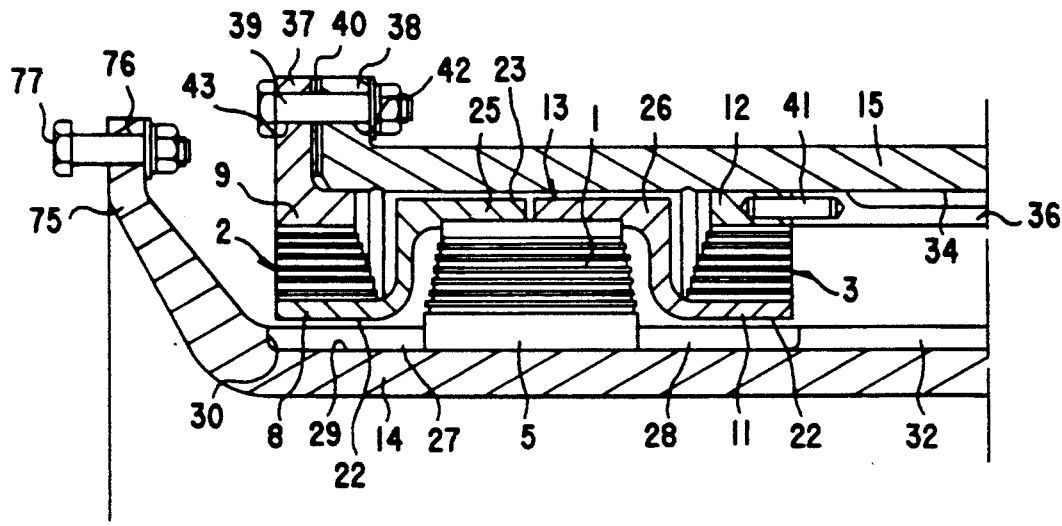
FIG. 7 is an axial cross-sectional view of the cylindrical elastomeric bearing shown in FIG. 6 when mounted between an inner sleeve and an outer sleeve in accordance with the invention.

FIG. 7 relates to the axial cross-section of the first bearing with wide angular displacement shown in FIGS. 1 and 2, and whose structure is that shown in FIG. 6.

this type of assembly, inner sleeve 14 comprises outer cylindrical face 29 which abuts upon bearing face 30 perpendicular to outer cylindrical face 29. This outer cylindrical face 29 is fitted with a bearing surface 27, inner armature 5 of central element 1, another bearing surface 28, and inner tie-piece 32. Outer sleeve 15 comprises inner cylindrical face 34 which abuts upon bearing face 35 perpendicular to this inner cylindrical face 34. Inner cylindrical face 34 is fitted with outer tie-piece 36, outer armature 12 of lateral element 3, and outer armature 9 of lateral element 2.

The means used to axially hold the assembly of elements fitted to inner cylindrical face 34 of outer sleeve 15 and to make them bear against bearing face 35, as already seen in relation to FIGS. 1 and 2, consist of means fixing outer armature 9 of lateral element 2 to the corresponding end of outer sleeve 15. To achieve this, outer armature 9 of lateral element 2 comprises a flange 37 made at its periphery, and which presses against a flange 38 made at the periphery of the end of outer sleeve 15. A seal 40 is placed between flange 38 of outer sleeve 15 and flange 37 of outer armature 9 of lateral element 2, these two flanges 37 and 38 then being locked in relation to each other by means of a series of bolts 39 which pass through the series of holes 42 and 43, made respectively in flange 38 of the outer sleeve 15 and in flange 37 of the outer armature 9 of lateral element 2.

Preferably, in accordance with the invention, the radial dimensions of inner faces 22 of common armature 13, i.e. the inner faces of inner armatures 8 and 11, are substantially equal, respectively, to the radial dimensions of the outer faces of bearing surface 27 and of bearing surface 28, in such a way that it makes it possible to form a corresponding plain cylindrical bearing in both cases. Likewise, the radial dimensions of outer face 23 of common armature 13 are substantially equal to those of inner face 34 of outer sleeve 15, in such a way as to form a plain cylindrical bearing. The working play of these different plain bearings is sufficient to allow circular displacement of inner sleeve 14 and outer sleeve 15, with respect to each other, when different radial stresses are applied. This arrangement, in accordance with the invention, is therefore "fail safe" in nature, as it allows the spans of common armature 13 to be used as plain bearings in the event of deterioration of the elastomeric material of the laminations of central parts 4, 7 and 10. In an embodiment not shown in the Figures, in which inner armature 5 of the central element 1 might be mounted on inner sleeve 14 without the use of bearing surfaces 27 and 28, the radial dimensions of inner faces 22 of common armature 13 are substantially equal to those of outer cylindrical face 29 of inner sleeve 14, in such a way as to also form plain back-up bearings with sufficient working play.

In the constructional method of the cylindrical elastomeric bearing with wide angular displacement or deflection shown in FIG. 7, central part 4 of central element 1, central part 7 of lateral element 2 and central part 10 of lateral element 3 are each cylindrical, the axis being that of inner and outer sleeves 14 and 15.

The end of inner sleeve 14, located on the side of the first cylindrical elastomeric bearing with wide angular displacement, flares out so as to terminate at its periphery in a flange 75 in which holes 76 are made. These holes 76 receive the fixing bolts 77 of inner sleeve 14.

Beginning with FIG. 7 and referring to FIGS. 1 and 2, which represent a system of two cylindrical elastomeric bearings of similar structure to that shown in FIG. 7, it can be seen that a first cylindrical bearing is arranged to the left of the Figure and a second cylindrical bearing to the right, and that these two cylindrical elastomeric bearings are fitted between inner sleeve 14 and outer sleeve 15. These two cylindrical elastomeric bearings are separated from each other by means of inner tie-piece 32 and outer tie-piece 36.

Inner sleeve 14, comprising cylindrical face 29 which abuts upon bearing face 30, is fitted with:

bearing surface 27, inner armature 5 of central element 1 and the other bearing surface 28 of the first cylindrical elastomeric bearing;

inner tie-piece 32;

bearing surface 27, inner armature 5 of central element 1 and bearing surface 28 of the second cylindrical elastomeric bearing;

means of axially holding the system of elements fitted to outer cylindrical face 29 of inner sleeve 14 in such a way as to make them bear against bearing face 30.

The axial holding means are made up of thread 31 made at the end of cylindrical face 29 opposite bearing face 30, and by a nut 33 which screws onto thread 31 so as to make the system of elements bear against bearing face 30.

Outer sleeve 15, comprising inner cylindrical face 34 which abuts upon bearing face 35, is fitted with:

outer armature 12 of lateral element 3 and outer armature 9 of lateral element 2 of the second cylindrical elastomeric bearing;

outer tie-piece 36;

outer armature 12 of lateral element 3 and outer armature 9 of lateral element 2 of the first cylindrical elastomeric bearing;

means for axially holding the system of elements fitted to the inner cylindrical face 34 of outer sleeve 15, in such a way as to make them bear against bearing face 35 via outer armature 12 of lateral element 3 of the second cylindrical bearing.

The means for axially holding the system of elements fitted to the inner cylindrical face 34 of outer sleeve 15 are made up of the fixing means of outer armature 9 of lateral element 2 of the first cylindrical bearing. These fixing means are provided at the end of inner cylindrical face 34 opposite bearing face 35, in such a way that they fix outer armature 9 of lateral element 2 to the corresponding end of outer sleeve 15.

These fixing means are ensured by bolts 39 which fix flange 37, made at the end periphery of outer armature 9 of lateral element 2 of the first cylindrical elastomeric bearing, to flange 38 made at the corresponding end of outer sleeve 15.

Connecting pieces 41 connect, on the one hand, bearing face 35 of outer sleeve 15 to outer armature 12 of lateral element 3 of the second cylindrical elastomeric bearing, and on the other hand, outer armature 9 of lateral element 2 of this second cylindrical elastomeric bearing to outer tie-piece 36, and finally outer tie-piece 36 to outer armature 12 of lateral element 3 of the first cylindrical elastomeric bearing. To achieve this, holes corresponding to these connecting pieces 41 are made respectively:

in outer sleeve 15 on bearing face 35, and in outer armature 12 of the corresponding lateral element 3 of the second cylindrical elastomeric bearing, so as to rigidly lock in rotation outer armature 12 of lateral element 3 with outer sleeve 15;

in outer armature 9 of the other lateral element 2 of the second cylindrical elastomeric bearing, and in outer tie-piece 36 with outer armature 9 of the lateral element 2;

in outer tie-piece 36, on the other end face, and in outer armature 12 of the corresponding lateral element 3 of the first cylindrical elastomeric bearing, so as to rigidly lock in rotation outer armature 12 of the lateral element 3 with outer tie-piece 36.

the embodiment shown in FIGS. 1 and 2, the central part of each of the elements of one of the cylindrical elastomeric bearings is identical to the central part of each of the corresponding elements of the other cylindrical elastomeric bearing.

Figure 8:
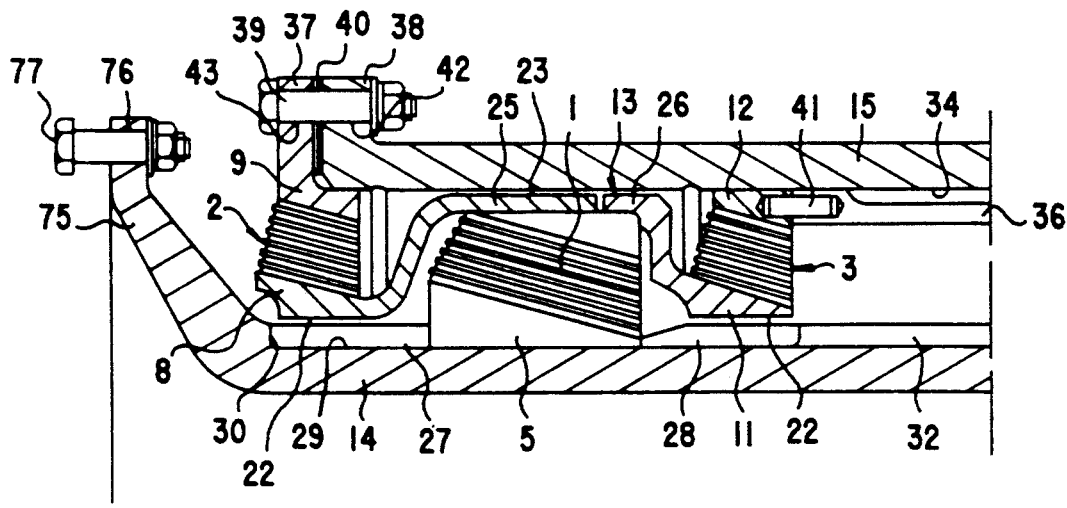
FIG. 8 is an axial cross-sectional view similar to the one shown in FIG. 7 of an another embodiment of the invention.

FIG. 8 shows a cross-sectional view similar to the one shown ill FIG. 7, in which central part 4 of central element 1, central part 7 of lateral element 2 and central part 10 of lateral element 3 are in the shape of a truncated cone whose axis is the same as that of inner sleeve 14 and outer sleeve 15. This type of bearing allows the taking up of combined radial and axial stresses, or simply the introduction of prestressing to the assembly in order to improve the resistance to fatigue of the elastomer.

Figure 9:
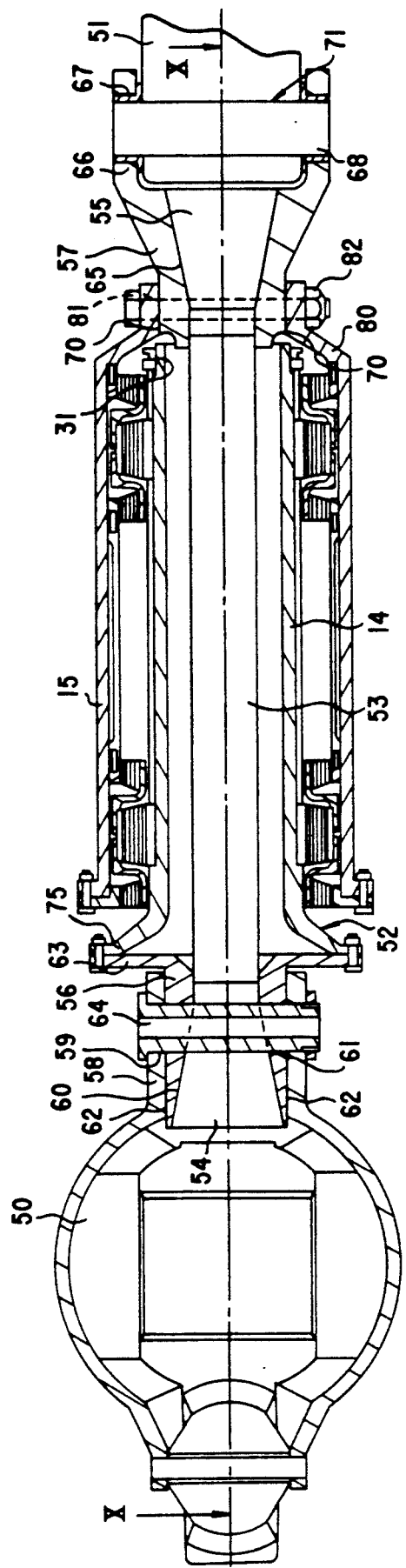
FIG. 9 is an axial cross-sectional view of the system of cylindrical elastomeric bearings in accordance with the invention mounted on the rotor head of a helicopter.
Figure 10:
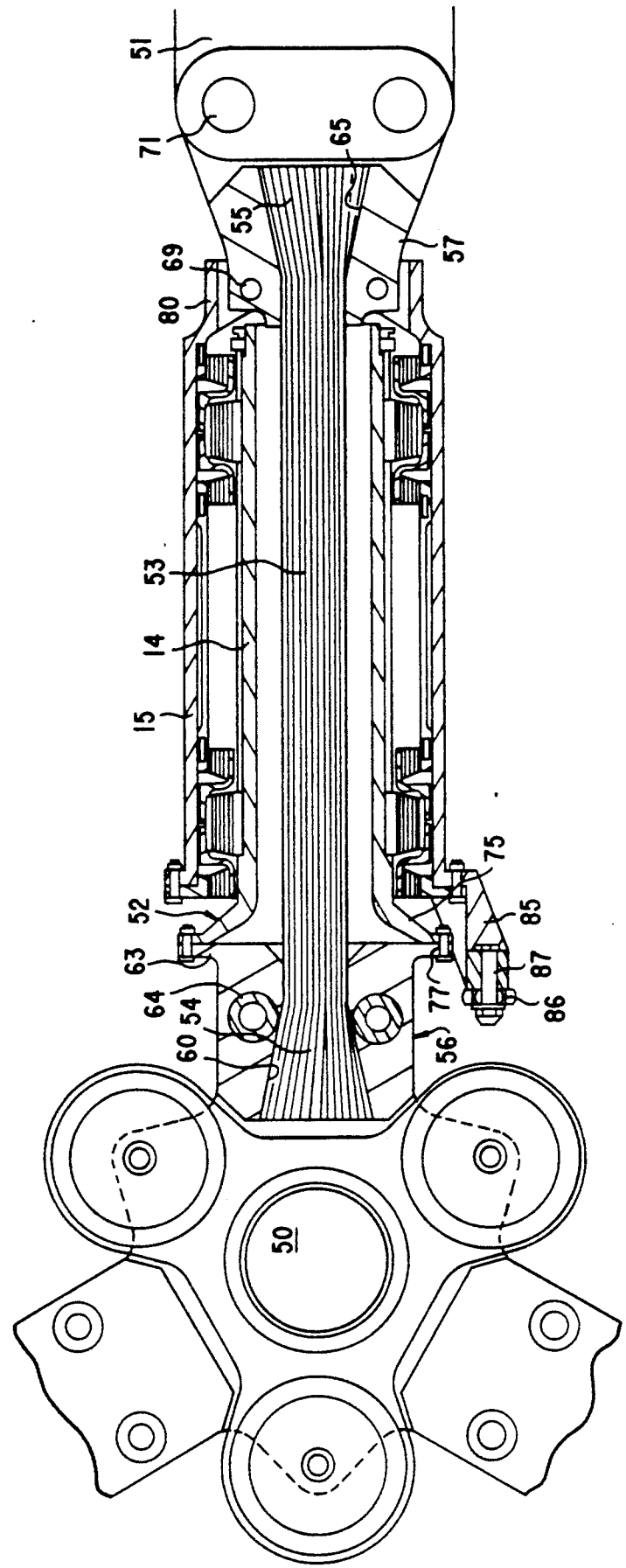
FIG. 10 is an axial cross-sectional view taken along line X—X of FIG. 9.

This system of laminated cylindrical elastomeric bearings, in accordance with the invention, is ideal in particular for mounting on a gyroplane rotor head, and in particular on a helicopter rotor head, as can be seen in FIGS. 9 and 10. The rotor head comprises a hub body 50 which is connected to each blade 51 by a system of laminated cylindrical elastomeric bearings, in accordance with the invention, shown in FIGS. 1 and 2. The hub body 50 is fitted with, for each blade 51, an arm 52 which is, in fact, the inner sleeve 14 of the corresponding system of laminated cylindrical elastomeric bearings. The outer sleeve 15 of this system of laminated cylindrical elastomeric bearings is connected to blade 51. Moreover, the device for controlling the pitch of this blade 51 is connected to outer sleeve 15, a direct connection being made between hub body 50 and the corresponding blade 51. This direct connection is designed to be flexible in torsion in order to follow pitch commands and rigid and hardly deformable in traction, in such a way that it directly transmits the stresses due to the centrifugal force on blade 51 to the hub body 50.

The direct connection between hub body 50 and corresponding blade 51 is ensured by a torsible bundle 53 arranged inside inner sleeve 14. Inner end 54 of this torsible bundle 53 is mounted in an inner intermediary element 56 rigidly locked to hub body 50. The other end of torsible bundle 53, i.e. outer end 55, is mounted in an outer intermediary element 57 which is solidly locked to blade 51.

Inner intermediary element 56 comprises a housing 60 which flares out towards the axis of the rotor, in such a way as to receive the matching three dimensional shape or form of the corresponding inner end 54 of torsible bundle 53. Inner intermediary element 56 is mounted in a double yoke 58 made on hub body 50. Inner intermediary element 56 has two holes 61, which are both aligned respectively with two holes 59 belonging to double yoke 58. These holes 59 and 61 are aligned along an axis which is substantially parallel to the axis of the rotor, to enable it to receive the two fixing bolts 64 that secure inner intermediary element 56 to hub body 50.

Inner sleeve 14 is fitted with a flange 75 at its end facing threaded end 31. This flange 75 presses against flange 63 which belongs to inner intermediary element 56. Flange 75 of inner sleeve 14 is rigidly locked to the corresponding flange 63 of inner intermediary element 56 by means of bolts 77, so as to form arm 52 of hub body 50 of the corresponding blade 51.

Outer intermediary element 57 comprises a housing 65 which flares out towards blade 51, in such a way as to receive the matching three dimensional shape or form of the corresponding outer end 55 of torsible bundle 53. This outer intermediary element 57 has a double yoke 66 in which the foot of blade 51 engages. This double yoke 66 and the foot of blade 51 have two series of holes, each series of holes having two holes 67 made in double yoke 66 and one hole 71 made in the foot of blade 51. The two holes 67 and hole 71 are aligned in relation to each other along an axis that is substantially parallel to the axis of the rotor, in such a way as to receive one of the two corresponding fixing bolts 68 that secure blade 51 to outer intermediary element 57.

Outer sleeve 15 is fitted with a double yoke 80 made at its end facing fixing flange 38 of lateral element 2 of the first cylindrical bearing. This double yoke 80 receives outer intermediary element 57. Double yoke 80 and outer intermediary element 57 have holes 81 and 69 which are aligned in relation to each other. The holes specifically include two holes 81 made in the double yoke 80 and one hole 69 made in outer intermediary element 57, the two holes 81 and hole 69 of each of the holes being aligned in relation to each other along an axis that is substantially parallel to the axis of the rotor, so as to receive one of the two fixing bolts 82 that secure outer sleeve 15 to outer intermediary element 57.

In accordance with the invention, the device for controlling the pitch of the blade is mounted on outer sleeve 15. To achieve this, it is connected to a support 85 which is directly connected to flange 38 of this outer sleeve 15. This support 85 comprises an articulation axis 87 on which pitch control rod 86 is mounted.

What is claimed is that:

1. Cylindrical elastomeric bearing with wide angular deflection, comprising three coaxial cylindrical torsible elements: one central element, and two lateral elements arranged either side of the central element, each torsible cylindrical element comprising a deformable elastomeric central part, relatively flexible angularly and relatively rigid radially, which is rigidly locked to an inner armature and an outer armature; wherein the outer armature of the central element and the inner armature of each lateral element are rigidly locked together so as to form a single common armature; wherein the inner armature of the central element is mounted on an inner sleeve to which it is rigidly locked, and the outer armature of each lateral element is mounted in an outer sleeve to which they are rigidly locked; wherein the inner sleeve and outer sleeve are coaxially arranged in such a way that the outer sleeve and inner sleeve can rotate in relation to each other about their common axis with virtually no possibility of radial deflection.

2. Cylindrical elastomeric bearing as claimed in claim 1, wherein the capacity of each lateral element is substantially half that of the central element, in such a way that the angular deflection of the central element with the two lateral elements is substantially double that of the central element alone.

3. Cylindrical elastomeric bearing as claimed in claim 1, wherein the central part of each torsible cylindrical elastomeric element that is relatively flexible angularly and relatively rigid radially, is made up of a laminated assembly.

4. Cylindrical elastomeric bearing as claimed in claim 3, wherein the laminated assembly is formed of rigid tubes of circular section, alternated with elastomer layers, the inner armature, outer armature, rigid tubes and elastomer layers being assembled by vulcanization so as to form a body which transmits radial stresses with substantially no deformation, but being elastically deformable angularly to allow rotational movements of the inner and outer armatures in relation to each other.

5. Cylindrical elastomeric bearing as claimed in claim 1, wherein radial dimensions of inner faces of the central parts of the central and lateral elements are substantially identical in a transverse direction, and radial dimensions of outer faces of the central parts of the central and lateral elements are substantially identical in the transverse direction.

6. Cylindrical elastomeric bearing as claimed in claim 1, wherein the cylindrical elastomeric bearing comprises two intermediary armatures each being integrally formed with the inner armature of a corresponding lateral element, said two intermediary armatures being rigidly locked to the outer armature of the central element so as to form the common armature.

7. Cylindrical elastomeric bearing as claimed in claim 6, wherein each of the intermediary armatures is fixed to the outer armature of the central element by forced fitting.

8. Cylindrical elastomeric bearing as claimed in claim 1, wherein radial dimensions of inner faces and outer faces of the common armature are substantially equal, respectively, to radial dimensions of outer cylindrical faces of the inner sleeve and inner cylindrical faces of the outer sleeve, in such a way as to form plain back-up bearings with sufficient working play on application of different radial stresses and circular deflection of the inner and outer sleeves in relation to each other.

9. Cylindrical elastomeric bearing as claimed in claim 1, wherein the inner armature of the central element is rigidly locked to the inner sleeve by forced fitting.

10. Cylindrical elastomeric bearing as claimed in claim 8, wherein the inner sleeve is fitted with a bearing surface arranged on each side of the inner armature of the central element, the dimensions of an outer face of the inner armature being substantially equal to those of a corresponding inner face of the common armature in such way as to form a corresponding plain back-up bearing.

11. Cylindrical elastomeric bearing as claimed in claim 1, wherein the outer armature of each of the two lateral elements is rigidly locked to the outer sleeve by forced fitting.

12. Cylindrical elastomeric bearing as claimed in claim 1, wherein the central part of the central element and the central part of each of the two lateral elements are cylindrical, their common axis being that of the inner and outer sleeves.

13. Cylindrical elastomeric bearing as claimed in claim 1, wherein the central part of the central element and the central part of each of the two lateral elements are in an shape of a truncated cone, the axis of which is that of the inner and outer sleeves.

14. System of cylindrical elastomeric bearings, comprising first and second cylindrical elastomeric bearings with wide angular deflection, formed between an inner sleeve and an outer sleeve, each of said first and second cylindrical elastomeric bearings comprising three coaxial cylindrical torsible elements: one central element, and two lateral elements arranged either side of the central element, each torsible cylindrical element having a deformable elastomeric central part, relatively flexible angularly and relatively rigid radially, which is rigidly locked to an inner armature and an outer armature, the outer armature of the central element and the inner armature of each lateral element being rigidly locked together so as to form a single common armature, wherein the inner armature of the central element is mounted on the inner sleeve to which it is rigidly locked, and the outer armature of each lateral element is mounted in the outer sleeve to which it is rigidly locked, the inner sleeve and outer sleeve being coaxially arranged in such as way that the outer sleeve and inner sleeve can rotate in relation to each other about their common axis with virtually no possibility of radial deflection.

15. System of cylindrical elastomeric bearings as claimed in claim 14, wherein:
the first cylindrical elastomeric bearing with wide angular deflection is fitted between blade ends of the inner and outer sleeves;
the second cylindrical elastomeric bearing with wide angular deflection is fitted between hub ends of the inner and outer sleeves;
in such a way that the first and second cylindrical elastomeric bearings are positioned opposite each other.

16. System of cylindrical elastomeric bearings as claimed in claim 15, wherein the central part of each of the elements of one of the cylindrical elastomeric bearings is identical to the central part of each of the corresponding elements of the other cylindrical elastomeric bearing.

17. System of cylindrical elastomeric bearings as claimed in claim 15, wherein:
the inner sleeve comprises an outer cylindrical face having a bearing face at one end, and which is fitted with:
inner bearing surfaces and the central element of the first cylindrical elastomeric bearing;
an inner tie-piece;
inner bearing surfaces and the central element of the second cylindrical elastomeric bearing; and
means for axially holding the central element of the first bearing, the second central element of the bearing and the inner tie-piece on the outer cylindrical face of the inner sleeve pressing against the bearing face of the inner sleeve; and
the outer sleeve comprises an inner cylindrical face having a bearing face at one end, and which is fitted with:
the two lateral elements of the second cylindrical bearing;
an outer tie-piece;
the two lateral elements of the first cylindrical elastomeric bearing; and
means for axially holding the lateral elements of the first and second cylindrical bearings and the outer tie-piece on the inner cylindrical face of the outer sleeve pressing against the bearing face of the outer sleeve.

18. System of cylindrical elastomeric bearings as claimed in claim 17, wherein the holding means of the inner sleeve comprises a thread made at a blade end of the outer cylindrical face, opposite said one end having the bearing face, and a nut which engages in the thread so as to hold the first and second bearings and the inner tie-piece pressing against the bearing face.

19. System of cylindrical elastomeric bearings as claimed in claim 17, wherein the holding means of the outer sleeve comprises means for fixing the outer armature of the lateral element of the first cylindrical elastomeric bearing, arranged at a first end of the inner cylindrical face opposite said one end having the bearing face of the outer sleeve, the fixing means securing the outer armature of the lateral element to the outer sleeve.

20. System of cylindrical elastomeric bearings as claimed in claim 19, wherein the means for fixing the outer armature of the lateral element to the outer sleeve comprises bolts which secure a flange made on a peripheral end of the outer armature to a flange made at the end of the outer sleeve adjacent said first end of said inner cylindrical face.

21. System of cylindrical elastomeric bearings as claimed in claim 19, wherein connecting pieces are arranged in corresponding holes made respectively:
in said bearing face of the outer sleeve and in the outer armature of the corresponding lateral element of the second cylindrical elastomeric bearing, so as to rigidly lock in rotation the outer armature of the lateral element with the outer sleeve;
in the outer armature of the other lateral element of the second cylindrical elastomeric bearing, and in the outer tie-piece on a second end face, so as to rigidly lock in rotation the outer tie-piece with the second elastomeric bearing; and
in the outer tie-piece, on a first end face, and in the outer armature of the corresponding lateral element of the first cylindrical elastomeric bearing, so as to rigidly lock in rotation the outer armature of the lateral element with the outer tie-piece.

22. Gyroplane rotor head, comprising for each of a plurality of blades, a system of cylindrical elastomeric bearings having first and second cylindrical elastomeric bearings with wide angular deflection, formed between an inner sleeve and an outer sleeve, each of said first and second cylindrical elastomeric bearings comprising three coaxial cylindrical torsible elements: one central element, and first and second lateral elements arranged either side of the central element, each torsible cylindrical element having a deformable elastomeric central part, relatively flexible angularly and relatively rigid radially, which is rigidly locked to an inner armature and an outer armature, the outer armature of the central element and the inner armature of each lateral element being rigidly locked together so as to form a single common armature, wherein the inner armature of the central element is mounted on an inner sleeve to which it is rigidly locked, and the outer armature of each lateral element is mounted in an outer sleeve to which it is rigidly locked, the inner sleeve and outer sleeve being coaxially arranged in such a way that the outer sleeve and inner sleeve can rotate in relation to each other about their common axis with virtually no possibility of radial deflection.

23. Rotor head as claimed in claim 22, comprising a hub body which is fitted, for each blade, with an arm which is the inner sleeve of a corresponding cylindrical elastomeric bearing system, and whose outer sleeve is connected to the blade; wherein a device for controlling a pitch of the blade is connected to the outer sleeve, and a direct connection is provided between the hub body and the corresponding blade, this direct connection being flexible in torsion and rigid in traction, so that stresses due to centrifugal forces of the blade are directly transferred to the hub body.

24. Rotor head as claimed in claim 23, wherein the direct connection between the hub body and the corresponding blade is ensured by a torsible bundle arranged inside the inner sleeve; wherein a first end of this torsible bundle is mounted in an inner intermediary element rigidly locked to the hub body, and a second end in an outer intermediary element is rigidly locked to the blade.

25. Rotor head as claimed in claim 24, wherein the inner intermediary element comprises a housing which flares out towards an axis of the rotor head, in such a way that it receives a matching three dimensional form of the first end of the torsible bundle, this inner intermediary element being mounted in a couble yoke of the hub body, the inner intermediary element and the double yoke having holes aligned in relation to each other, along an axis substantially parallel to the axis of the rotor head in such a way as to receive two fixing bolts that secure the inner intermediary element to the hub body.

26. Rotor head as claimed in claim 24, wherein the outer intermediary element comprises a housing which flares out towards the blade, in such a way as to receive a matching three dimensional form of the second end of the torsible bundle, this outer intermediary element having a double yoke in which a foot of the blade engages, the double yoke and the foot of the blade having holes aligned with each other, along an axis substantially parallel to an axis of the rotor head, in such a way as to receive two fixing bolts that secure the blade to the outer intermediary element.

27. Rotor head as claimed in claim 25, wherein the inner sleeve is provided with a flange made at a hub end located opposite a threaded end of the inner sleeve, this flange pressing against a flange of the inner intermediary element, the flange of the inner sleeve being rigidly locked to the corresponding flange of the inner intermediary element by means of bolts, so as to form the corresponding arm of the hub body.

28. Rotor head as claimed in claim 26, wherein the outer sleeve is provided with a double yoke made at a blade end opposite a fixing flange of the first lateral element of the first bearing, this double yoke receiving the outer intermediary element, the double yoke and the outer intermediary element having holes aligned with each other, along an axis substantially parallel to the axis of the rotor head, in such a way as to receive two fixing bolts which secure the outer sleeve to the outer intermediary element.

29. Rotor head as claimed in claim 22, wherein a device for controlling a pitch of the blade is connected to a support made on the outer sleeve, this support comprising an articulation axis on which a pitch control rod is mounted.

30. Rotor head as claimed in claim 29, wherein the support is directly connected to a flange of the outer sleeve located near a hub end thereof.

* * * * *